United States Patent
Bays et al.

(10) Patent No.: US 6,275,948 B1
(45) Date of Patent: Aug. 14, 2001

(54) PROCESSOR POWERDOWN OPERATION USING INTERMITTENT BURSTS OF INSTRUCTION CLOCK

(75) Inventors: Laurence E. Bays, Allentown; Jalil Fadavi-Ardekani, Orefield; Kenneth Daniel Fitch, Allentown; Richard Joseph Niescier, Bethlehem, all of PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/141,511

(22) Filed: Aug. 27, 1998

Related U.S. Application Data

(60) Provisional application No. 60/065,855, filed on Nov. 14, 1997.

(51) Int. Cl.[7] .................................................. G06F 1/26
(52) U.S. Cl. ........................ 713/320; 713/323; 365/227
(58) Field of Search ..................................... 713/320, 300, 713/322–323; 365/226, 227, 233, 236; 377/44, 39, 114

(56) References Cited

U.S. PATENT DOCUMENTS

| | | | |
|---|---|---|---|
| 3,774,167 | * | 11/1973 | Puckette et al. ................. 340/172.5 |
| 4,425,613 | * | 1/1984 | Shelly ................................... 363/26 |
| 4,743,864 | * | 5/1988 | Nakagawa et al. .................... 331/1 |
| 5,475,823 | * | 12/1995 | Amerson et al. ..................... 711/167 |
| 5,485,127 | * | 1/1996 | Bertoluzzi et al. .................... 331/69 |
| 5,566,256 | * | 10/1996 | Harding, Jr. ......................... 382/320 |
| 5,625,311 | * | 4/1997 | Nakatsu ............................... 327/295 |
| 5,845,060 | * | 12/1998 | Vrba et al. ............................. 714/12 |
| 5,895,997 | * | 4/1999 | Puskas et al. ........................ 310/316 |
| 6,067,273 | * | 5/2000 | Morgan ............................... 365/236 |

* cited by examiner

*Primary Examiner*—Ario Etienne
(74) *Attorney, Agent, or Firm*—William H. Hollman

(57) ABSTRACT

An instruction clock of a processing unit in a low power mode in accordance with the principles of the present invention is qualified with a burst mode control signal. The burst mode control signal is allowed to start and stop the instruction flow of the relevant processing unit. In the disclosed embodiment, a master clock signal is qualified by a clock control circuit to provide bursts of an instruction clock signal to the relevant processing unit. To operate the burst instruction cycle control unit, a user pre-programs a burst length, into a register to set the length of the burst of instruction cycles to the relevant processing unit. A maximum counter value in a counter sets the period of the instruction cycle bursts provided to the relevant processing unit. As long as the current value of the counter is less than or equal to the pre-programmed burst length, the burst control signal allows a clock controller to pass a master clock signal or other relevant clock signal as an instruction clock signal to the relevant processing unit. The low power burst mode and thus the power savings is adjustable according to the combined values of burst length and maximum counter value.

30 Claims, 1 Drawing Sheet

PROCESSOR POWERDOWN OPERATION USING INTERMITTENT BURSTS OF INSTRUCTION CLOCK

This application claims priority from U.S. Provisional Application No. 60/065,855, entitled "Multipurpose Digital Signal Processing System", filed on Nov. 14, 1997, the specification of which is hereby expressly incorporated herein by reference.

BACKGROUND OF THE INVENTION

1. Field of the Invention

This invention relates generally to the reduction of power usage by processing units. More particularly, it relates to the reduction of power usage by a processing unit while allowing the clock cycles of the processing unit to occur at full rate.

2. Background of Related Art

The increasing use of portable devices has generated a need in the industry for low power processing units. The lower power the processing unit, the longer the useful life of the portable device and/or the smaller the required battery.

Moreover, continued integration of devices has generated an environment wherein multiple processing units or other devices perform separate tasks but in coordination with one another. Oftentimes, the processing units and/or other devices communicate based on common timing or within certain time frames. Conventionally, a continuously operating master clock is typically required to maintain communications between the separate devices or circuits.

One common technique for reducing unnecessary power dissipation is to qualify the master clock input to devices which are not required for the particular application(s). According to this technique, the master clock is withheld from the unused devices. Another similar conventional technique halts the instruction cycles of an unused processing device entirely. However, these techniques either prevent communication with the unused processing devices, or require the processing device to power up to receive the communications.

Another conventional approach to reduce power consumption allows the master clock to operate at full rate for certain processing units or other devices, but stretches the master clock signal for input to unused or powered-down devices. This technique effectively reduces the frequency of the instruction clock for those processing units or other devices which are not needed or are otherwise in a power down mode. However, reduction of the frequency of the instruction clock in a processing unit typically requires cumbersome circuitry to stretch the master clock signal, and slows communications between powered-down devices and fully operating devices, detrimentally affecting the application program(s) running on the full-rate devices.

There is a need for a method and apparatus to allow the reduction of power in a processing unit without the need for clock stretching circuitry and/or without affecting the performance of other devices.

SUMMARY OF THE INVENTION

In accordance with the principles of the present invention, an instruction cycle control unit comprises storage for a burst length value, a counter, and a comparator adapted to compare the burst length value with a value of the counter. A clock controller controls an output of an instruction clock based on the comparison of the burst length value with the value of the counter.

A method of reducing power utilization of a processing unit in accordance with one aspect of the present invention comprises receiving a master clock signal. An instruction cycle burst length is evaluated with respect to a counter value based on the master clock signal. The processing unit is allowed to execute instructions when the counter value is either less than or greater than a predetermined value based on the instruction cycle burst length, and disallowed to execute instructions when the counter value is the other of less than or greater than the instruction cycle burst length.

A method of controlling execution of instruction cycles of a processing unit in accordance with another aspect of the present invention comprises qualifying an instruction cycle clock of the processing unit with an intermittent signal, whereby power consumption of the processing unit is decreased as an active duty cycle of the intermittent signal is reduced.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a method and apparatus for reducing the power dissipation of a processing unit by providing intermittent full rate bursts of the instruction clock of the processing unit. The processing unit may be, e.g., a microprocessor, a microcontroller, a digital signal processor (DSP), and/or a host controller.

In accordance with the disclosed embodiment of the present invention, the instruction clock of a processing unit in a low power mode in accordance with the principles of the present invention is qualified with a burst mode control signal. The burst mode control signal is allowed to start and stop the instruction flow of the relevant processing unit. As a result, the low power mode processing unit's average number of executed instructions per second is reduced to reduce the overall power consumption of the processing unit, yet the executed instructions are performed at full rate.

Figure 1:
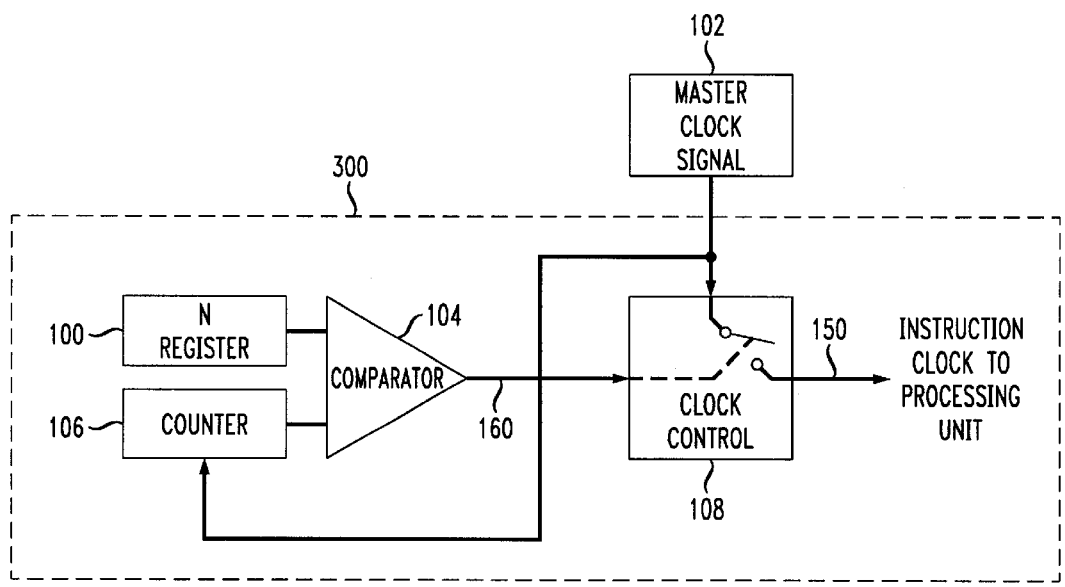
FIG. 1 is a block diagram of a burst mode controller in accordance with the principles of the present invention.

FIG. 1 illustrates one exemplary implementation of a burst instruction cycle control unit 300 for a processor capable of low power operation in accordance with the principles of the present invention.

In particular, the burst instruction cycle control unit 300 includes a comparator 104 for comparing the value stored in a latch 100 to the current value of a counter 106. A master clock signal 102 is qualified by a clock control circuit 108 to provide bursts of an instruction clock signal 150 to the relevant processing unit.

To operate the burst instruction cycle control unit 300, a user pre-programs a burst length N into latch 100. The burst length N may be set either by the relevant processing unit operating in low power mode, or may be set by another processing unit or other device.

The value of the burst length N in the latch 100 sets the length of the burst of instruction cycles to the relevant processing unit. The latch 100 may be set once for a particular application, or may be repeatedly changed during the operation of an application program. For instance, before a communication with another device of a given length, the application program may set the burst length N to a higher value allowing a longer burst of instruction cycles. On the other hand, if the application program is in a continuous loop awaiting an interrupt or other infrequent occurrence, the burst length N may be set to a comparatively lower value to provide shorter bursts of instruction cycles to the relevant processor to thus consume the lowest amount of power.

The counter 106 incrementally counts up from 0 to M based on cycles of the master clock signal 102. The maximum counter value M of the counter 106 sets the period of the instruction cycle bursts provided to the relevant processing unit. The maximum counter value M may be fixed at a particular value, e.g., a power of 2 based on a bit counter of a given length, or may be programmable such as in a timer based on the master clock signal 102.

The counter 106 in the disclosed embodiment increments by one for each cycle of a master clock. The counter 106 may alternatively be incremented based on a multiple or division of the master clock signal 102. After reaching the maximum counter value M, the counter 106 wraps around back to the value 0, and continues to count upwards based on cycles of the master clock signal 102.

The counter 106 may be reset to zero or another value as appropriate to the particular application and/or processing unit. For instance, the counter 106 may be reset to zero whenever the latch 100 is written to, or upon a power-up reset of the processing unit. In the disclosed embodiment the counter 106 is reset to zero upon a power up reset.

Although an up-counter was implemented as the counter 106 in the disclosed embodiment shown in FIG. 1, the present invention is equally applicable to any type of counter, e.g., a down-counter, a count-by-2 counter, a timer, etc.

The comparator 104 compares the current value of the counter 106 with the pre-programmed burst length N stored in the latch 100, qualified with the timing of the master clock signal 102 or other timing source clocking the counter 106. As long as the current value of the counter 106 is less than or equal to the pre-programmed burst length N, a burst control signal 160 allows the clock control 108 to pass the master clock signal 102 or other relevant clock signal as an instruction clock signal to the relevant processing unit. In this state, the processing unit is allowed to execute instructions at the normal master clock rate. However, when the current value of the counter 106 exceeds the pre-programmed burst length N, the burst control signal 160 deactivates the clock control circuit 108 and the processing unit is thus stopped or halted from executing instructions. In the disclosed embodiment, the relevant processing unit may be re-started and allowed to execute further instructions once the counter 106 returns to an initial value, e.g., 0, either by wrapping around or by exceeding a maximum counter value M.

The clock control circuit 108 provides a communication path between the master clock signal 102 and the relevant processing unit. The clock control circuit 108 may comprise, e.g., a multiplexer or other electronic switch to allow passage of the master clock signal to the relevant processing unit based on control by the burst control signal 160. The clock control 108 and/or master clock signal 102 may also account for specific user conditions such as a complete halt mode or other conventional power down technique(s) of the relevant processing unit.

The counter 106 operates continuously based on the master clock signal 102 or other signal based on the master clock signal. In accordance with the disclosed embodiment, when the pre-programmed burst length N is set to zero, then the low power burst mode operation of the relevant processing unit is turned off and the processing unit is free to execute in a normal, full rate mode.

With the use of the latch 100, the low power burst instruction cycle mode of a relevant processing unit in accordance with the present invention is selectable, both on and off, and in level, by a user. As the value of the burst length N decreases, the overall power savings generally increases. For instance, a user can choose a reduction in the overall instruction rate and thus increased power savings by choosing a lower burst mode configuration of the burst instruction cycle control unit 300 for a relevant processor. The burst mode and thus the power savings is adjustable according to the combined values of burst length N and maximum counter value M.

Figure 2:
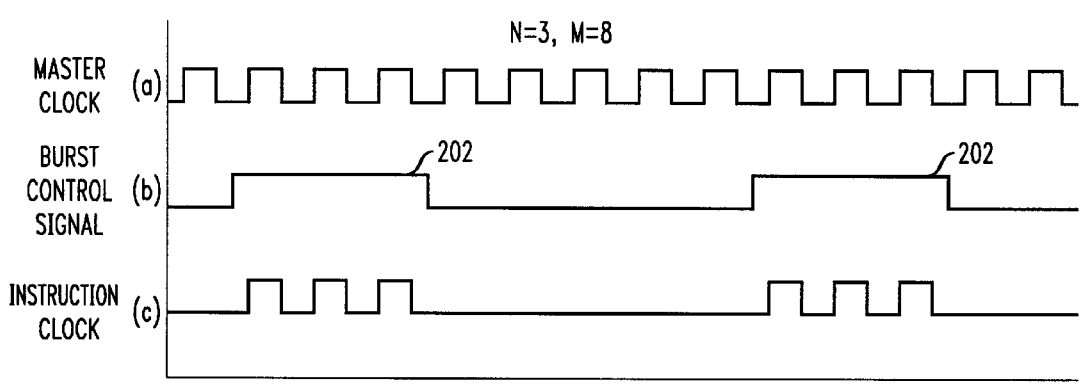
FIG. 2 is a timing diagram demonstrating the operation of an example of a burst mode controller in accordance with the principles of the present invention.

FIG. 2 is a timing diagram demonstrating an exemplary setting of a burst instruction cycle control unit in accordance with the principles of the present invention.

In particular, FIG. 2 shows an example of the disclosed embodiment wherein the pre-programmed burst length N=3 and wherein the counter 106 has a maximum value M=8 and thus repeatedly counts up from 0 to 8. Of course, these values of the pre-programmed burst length N and the maximum counter value M are exemplary only and not limited by the present invention. Other embodiments in accordance with the principles of the present invention including alternative values of the burst length N and the maximum counter value M are entirely possible and within the principles of the present invention.

Waveform (a) of FIG. 2 depicts a continuous master clock signal, waveform (b) of FIG. 2 depicts the burst control signal 160 with burst length N=3 and maximum counter value M=8, and waveform (c) depicts the resultant bursts of an instruction clock signal 150 output from the clock control circuit 108.

With a burst length N=3 and a maximum counter value M=8, a burst of 3 instruction cycles at full rate (based on an activation 202 of the burst control signal 160) are followed by 5 cycles of the main clock wherein the processing unit does not process instructions. Thus, for every 8 cycles of the master clock signal 102, only three are used to drive instruction cycles of the relevant processing unit while the relevant processing unit does not execute instructions during the other 5 cycles, thus reducing power consumption of the relevant processing unit.

In accordance with the principles of the present invention, stretching the instruction clock is unnecessary because the processing unit is intermittently allowed to run at the full clock rate when executing instructions. This eliminates the need for conventional clock stretching circuitry, which is typically cumbersome and tends to increase the size of an overall device.

The high or full rate burst nature of the power down mode in accordance with the principles of the present invention allows a system to run freely based on a master clock with transparent power down operation of selected processing units. The present invention is particularly advantageous for operation when the full instruction clock speed of a particular processing unit is desired, i.e., intermittently, but not its full capacity.

While the bursts are at the full master clock rate in the disclosed embodiment, the present invention is equally applicable to bursts at a reduced clock rate. Moreover, while the disclosed embodiment shows equal periods between each burst of the instruction clock, the present invention is equally applicable to intermittent bursts having varying and/or random spacing based on a particular application.

While the invention has been described with reference to the exemplary embodiments thereof, those skilled in the art will be able to make various modifications to the described embodiments of the invention without departing from the true spirit and scope of the invention.

What is claimed is:

1. A method of reducing power utilization of a processing unit, comprising:

receiving a master clock signal;

evaluating an instruction cycle burst length with respect to a counter value based on said master clock signal;

allowing said processing unit to execute instructions in response to said counter value being less than said instruction cycle burst length; and disallowing said processing unit to execute instructions in response to said counter value being greater than said instruction cycle burst length.

2. The method of reducing power utilization of a processing unit according to claim 1, further comprising:

adjusting said instruction cycle burst length.

3. The method of reducing power utilization of a processing unit according to claim 1, wherein:

said instruction cycle burst length is adjusted by said processing unit.

4. The method of reducing power utilization of a processing unit according to claim 1, wherein:

said instruction cycle burst length comprises a plurality of lengths each corresponding to a different level of power consumption by said processing unit.

5. The method of reducing power utilization of a processing unit according to claim 1, wherein:

a larger instruction cycle burst length corresponds to increased power consumption by said processing unit.

6. The method of reducing power utilization of a processing unit according to claim 1, wherein:

said method is selectably turned on and off by a user of said processing unit.

7. Apparatus for reducing power utilization of a processing unit, comprising:

means for receiving a master clock signal;

means for evaluating an instruction cycle burst length with respect to a counter value based on said master clock signal;

means for allowing said processing unit to execute instructions in response to said counter value being less than said instruction cycle burst length; and means for disallowing said processing unit to execute instructions in response to said counter value being greater than said instruction cycle burst length.

8. The apparatus for reducing power utilization of a processing unit according to claim 7, further comprising:

means for adjusting said instruction cycle burst length.

9. The apparatus for reducing power utilization of a processing unit according to claim 7, wherein:

said instruction cycle burst length is set by said processing unit.

10. The apparatus for reducing power utilization of a processing unit according to claim 7, wherein:

said instruction cycle burst length comprises a plurality of lengths each corresponding to a different level of power consumption by said processing unit.

11. The apparatus for reducing power utilization of a processing unit according to claim 7, wherein:

a larger instruction cycle burst length corresponds to increased power consumption by said processing unit.

12. The apparatus for reducing power utilization of a processing unit according to claim 7, wherein:

said apparatus is selectably turned on and off by a user of said processing unit.

13. An instruction cycle control unit comprising:

storage for a burst length value;

a counter;

a comparator adapted to compare said burst length value with a value of said counter; and a clock controller to control an output of an instruction clock based on said comparison of said burst length value with said value of said counter.

14. The instruction cycle control unit according to claim 13, wherein:

said instruction clock is output by said clock controller in bursts based on a comparison of said value of said counter to said burst length value.

15. The instruction cycle control unit according to claim 13, wherein:

said instruction clock is output by said clock controller in response to said value of said counter being less than said burst length value; and said instruction clock is not output by said clock controller in response to said value of said counter being greater than said burst length value.

16. The instruction cycle control unit according to claim 13, wherein:

said counter and said instruction clock are each based on a master clock signal.

17. The instruction cycle control unit according to claim 13, wherein:

said counter repeatedly counts to a maximum counter value, said maximum counter value establishing a period for bursts of said instruction clock.

18. The instruction cycle control unit according to claim 13, wherein:

said instruction clock is output by said clock controller in response to one of said value of said counter being greater than said burst length value; and said instruction clock is not output by said clock controller in response to said counter being less than said burst length value.

19. A method of reducing power utilization of a processing unit, comprising:

receiving a master clock signal;

evaluating an instruction cycle burst length with respect to a counter value based on said master clock signal;

allowing said processing unit to execute instructions in response to said counter value being greater than said instruction cycle burst length; and disallowing said processing unit to execute instructions in response to said counter value being less than said instruction cycle burst length.

20. The method of reducing power utilization of a processing unit according to claim 19, further comprising:

adjusting said instruction cycle burst length.

21. The method of reducing power utilization of a processing unit according to claim 19, wherein:

said instruction cycle burst length is adjusted by said processing unit.

22. The method of reducing power utilization of a processing unit according to claim 19, wherein:

said instruction cycle burst length comprises a plurality of lengths each corresponding to a different level of power consumption by said processing unit.

23. The method of reducing power utilization of a processing unit according to claim 19, wherein:

a larger instruction cycle burst length corresponds to increased power consumption by said processing unit.

24. The method of reducing power utilization of a processing unit according to claim 19, wherein:

said method is selectably turned on and off by a user of said processing unit.

25. Apparatus for reducing power utilization of a processing unit, comprising:

means for receiving a master clock signal;

means for evaluating an instruction cycle burst length with respect to a counter value based on said master clock signal;

means for allowing said processing unit to execute instructions in response to said counter value being greater than said instruction cycle burst length; and means for disallowing said processing unit to execute instructions in response to said counter value being, less than said instruction cycle burst length.

26. The apparatus for reducing power utilization of a processing unit according to claim 25, further comprising:

means for adjusting said instruction cycle burst length.

27. The apparatus for reducing power utilization of a processing unit according to claim 25, wherein:

said instruction cycle burst length is set by said processing unit.

28. The apparatus for reducing power utilization of a processing unit according to claim 25, wherein:

said instruction cycle burst length comprises a plurality of lengths each corresponding to a different level of power consumption by said processing unit.

29. The apparatus for reducing power utilization of a processing unit according to claim 25, wherein:

a larger instruction cycle burst length corresponds to increased power consumption by said processing unit.

30. The apparatus for reducing power utilization of a processing unit according to claim 25, wherein:

said apparatus is selectably turned on and off by a user of said processing unit.

\* \* \* \* \*